United States Patent
Mucke

Patent Number: 5,764,692
Date of Patent: Jun. 9, 1998

[54] DUAL MODE RADIOTELEPHONE MODULATOR

[75] Inventor: Lars H. Mucke, San Diego, Calif.

[73] Assignee: Nokia Mobile Phones, Ltd., Salo, Finland

[21] Appl. No.: 767,289

[22] Filed: Dec. 16, 1996

Related U.S. Application Data

[63] Continuation of Ser. No. 303,699, Sep. 9, 1994, abandoned.

[51] Int. Cl.$^6$ .................................................. H04L 27/32
[52] U.S. Cl. ...................... 375/216; 375/298; 375/308; 455/553; 455/574; 455/102; 332/119
[58] Field of Search ............................ 455/403, 550, 455/552, 553, 573, 93, 95

[56] References Cited

U.S. PATENT DOCUMENTS

| | | | |
|---|---|---|---|
| 3,938,155 | 2/1976 | Mears et al. | 343/107 |
| 4,131,849 | 12/1978 | Freeburg et al. | 325/54 |
| 4,229,821 | 10/1980 | de Jager et al. | 375/53 |
| 4,418,416 | 11/1983 | Lese et al. | 375/5 |
| 4,481,489 | 11/1984 | Kurby | 332/19 |
| 4,488,296 | 12/1984 | Yamamoto et al. | 370/104 |
| 4,608,699 | 8/1986 | Batlivala et al. | 375/5 |
| 4,737,968 | 4/1988 | Norton et al. | 375/60 |
| 4,748,685 | 5/1988 | Rozanski, Jr. | 455/218 |
| 4,940,954 | 7/1990 | Aubert et al. | 332/103 |
| 5,020,076 | 5/1991 | Cahill et al. | 375/5 |
| 5,124,672 | 6/1992 | Kuisma | 332/103 |

FOREIGN PATENT DOCUMENTS 0 170 324  2/1986  European Pat. Off. .

OTHER PUBLICATIONS

Product Brochure, "ICs For Communications, GSM Transmitter Circuit PBM 2200", Siemens, Ed. 5.90 (1990).

*Primary Examiner*—Don N. Vo
*Assistant Examiner*—Amanda T. Le
*Attorney, Agent, or Firm*—Perman & Green, LLP

[57] ABSTRACT

A dual-mode frequency and phase RF modulator (11) for use in a transmitter of a radiotelephone. A dual-mode modulation approach is employed wherein, in the analog (FM) mode of operation, a phase modulator, such as a π/4-shift DQPSK modulator, is bypassed and may be powered down. A frequency modulated RF carrier is coupled through a bypass circuit (52) to a modulator output node (50) for transmission from the radiotelephone. In the digital mode of operation, the bypass signal path is disabled, the π/4-shift DQPSK modulator is enabled, and in-phase (I) and quadrature (Q) signals are input to the π/4-shift DQPSK modulator which provides a phase modulated RF carrier that is coupled to the modulator output node for transmission from the radiotelephone. The teaching of this invention can be employed with radiotelephones having, by example, TDMA/analog capability or CDMA/analog capability.

13 Claims, 4 Drawing Sheets

DUAL MODE RADIOTELEPHONE MODULATOR

This application is a continuation of application Ser. No. 08/303,699 filed on Sep. 9, 1994 abandoned.

FIELD OF THE INVENTION

This invention relates generally to radiotelephones and, in particular, to cellular mobile telephones that are capable of both analog and digital operation.

BACKGROUND OF THE INVENTION

The operation of a dual mode (analog and digital) cellular mobile telephone system is set forth in an EIA/TIA Interim Standard entitled "Cellular System Dual-Mode Mobile Station-Base Station Compatibility Standard", IS-54-B (April 1992). The dual-mode EIA standard IS-54-B has features found in the conventional analog AMPS system and, in addition, digital voice transmission features. The radiotelephone operates in accordance with a Time Division Multiple Access (TDMA) technique with respect to a base station, and is assigned a time slot within a TDM frame for transmitting on an uplink (radiotelephone to base station) RF channel.

In this system a flexible increase of capacity is provided by dividing existing 30 khz bandwidth analog channels into a plurality of TDMA channels. As a result, the same cell area can support both analog and digital transmission of voice and control or signalling information. The preferred implementation of the mobile telephone or terminal is a dual mode operation device which can use analog channels where there is no digital support. In addition, the IS-54-B Interim Standard requires that the mobile terminal initially gain access to a digital channel through the analog channel. As a result, a dual operation terminal requires all of the functionality of a conventional analog mobile terminal, while also requiring digital functionality for TDMA digital mode operation.

One significant difference between the analog and digital modes of operation is in the required modulation for the transmission of voice and signaling information to a base station that serves a cell within which the terminal is currently located. The conventional analog terminal employs a frequency modulation (FM) of a radio frequency (RF) carrier signal. However, the digital terminal requires the use of a π/4-shift differential quadrature phase shift keying (DQPSK) modulation technique. These two modulation techniques are generally incompatible with one another.

Another application for a dual-mode radiotelephone is in the proposed standard for a Code Division-Multiple Access (CDMA) radiotelephone which also has conventional analog system (FM) compatibility. In the CDMA mode of operation the digital voice and pseudo-random (PN) code sequence information are combined and converted to I,Q signals which are used to phase modulate a carrier. The PN code sequence performs the desired spectral spreading of the transmitted information.

One approach to providing a dual-use modulator is disclosed in commonly assigned U.S. Pat. No. 5,124,672 (E. J. Kuisma). In this approach, analog or digital signals are applied to in-phase (I) and quadrature (Q) generators to form I,Q signals which modulate an intermediate frequency and, upon summation, modulate a transmission frequency.

OBJECTS OF THE INVENTION

An object of this invention to provide a dual-mode radiotelephone terminal that includes an RF modulation system that is operable in both the analog and the digital modes of operation.

It is a further object of the invention to provide a dual-mode radiotelephone terminal that provides an alternate signal path when operating in the analog (FM) mode of operation, thereby bypassing the digital mode phase modulator.

It is a further object of this invention to provide a dual-mode RF modulation system that enables, when operating in the analog (FM) mode of operation, the phase modulator to be powered down, thereby conserving battery power.

SUMMARY OF THE INVENTION

The foregoing and other problems are overcome and the objects of the invention are realized by, in one embodiment, a dual-mode FM and π/4-shift DQPSK RF modulator for use in a transmitter of a radiotelephone. A dual-mode modulation approach is employed wherein, in the analog (FM) mode of operation, the π/4-shift DQPSK modulator is bypassed and may be powered down. A frequency modulated RF carrier is coupled through a bypass circuit to a modulator output node for transmission from the radiotelephone. In the digital mode of operation, the bypass signal path is disabled, the π/4-shift DQPSK modulator is enabled, and in-phase (I) and quadrature (Q) signals are input to the π/4-shift DQPSK modulator which provides a phase modulated RF carrier that is coupled to the modulator output node for transmission from the radiotelephone.

In a second embodiment, for use in a dual-mode radiotelephone having CDMA capabilities, the invention functions in a similar fashion. That is, a dual-mode modulation approach is employed wherein, in the analog (FM) mode of operation, the phase modulator is bypassed and may be powered down. A frequency modulated RF carrier is coupled through a bypass circuit to a modulator output node for transmission from the radiotelephone. In the digital mode of operation, the bypass signal path is disabled, the phase modulator is enabled, and in-phase (I) and quadrature (Q) signals are input to the phase modulator which provides a phase modulated RF carrier that is coupled to the modulator output node for transmission from the radiotelephone.

BRIEF DESCRIPTION OF THE DRAWING

The above set forth and other features of the invention are made more apparent in the ensuing Detailed Description of the Invention when read in conjunction with the attached Drawing, wherein.

DETAILED DESCRIPTION OF THE INVENTION

The described embodiments of this invention provide modulation in both an analog and a digital mode of operation (dual-mode) of a cellular radiotelephone terminal, referred to hereinafter as a mobile terminal. Although described below primarily in the context of a TDMA/analog radiotelephone, it should be realized that the teaching of this invention applies equally to a dual-mode radiotelephone having CDMA/analog capabilities and, in general, to many transmitter arrangements wherein both digital and analog modes of operation must be accommodated.

Figure 1:
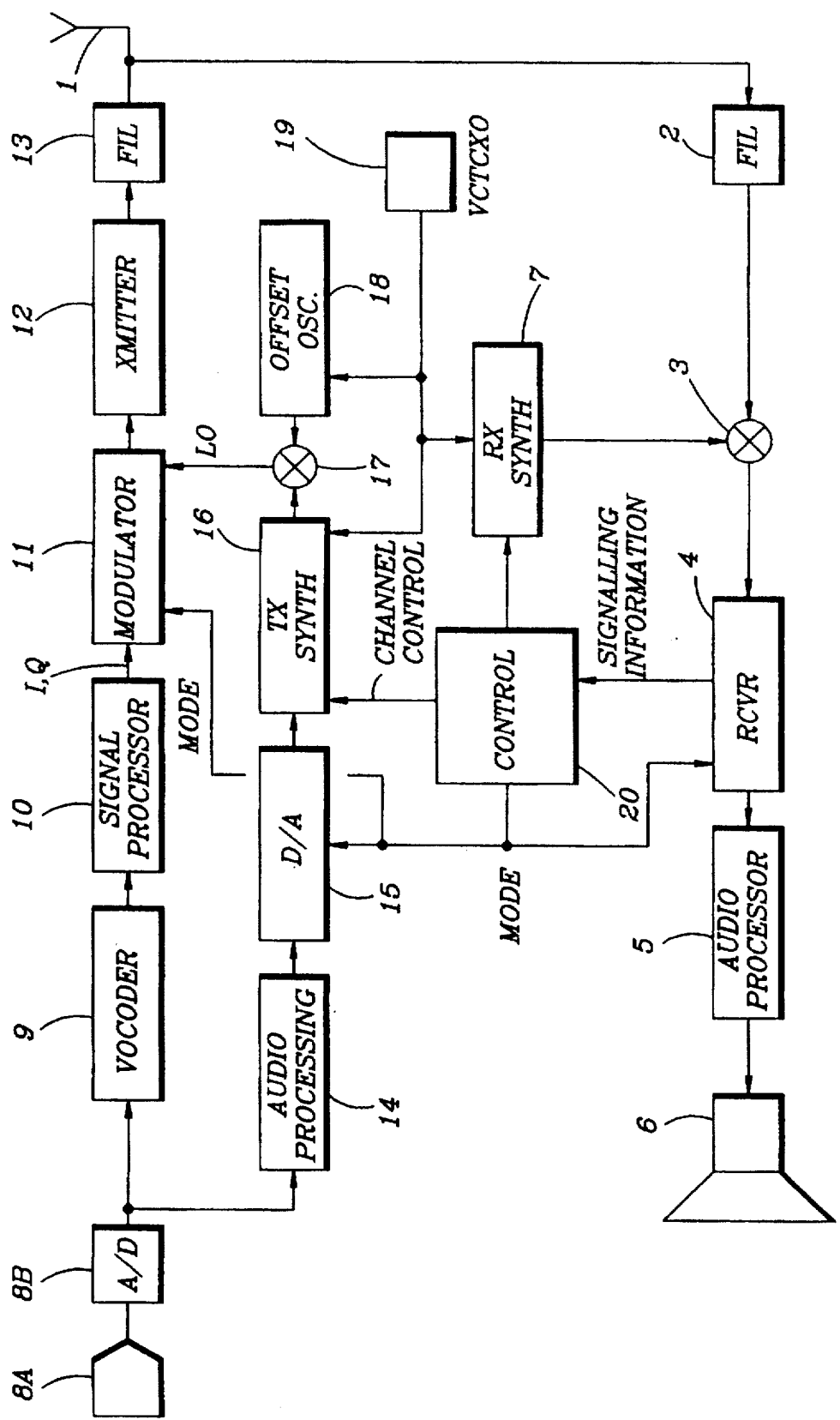
FIG. 1 is a block diagram of an embodiment of a mobile telephone that is constructed in accordance with the invention.

FIG. 1 illustrates a block diagram of a first embodiment of a dual-mode, (TDMA/analog) mobile terminal that is constructed in accordance with the invention. An antenna (1) receives a signal from a base station (not shown) and the received signal is fed through a bandpass filter (2) to a mixer (3). The receiver's first local oscillator signal is generated with an RX-synthesizer (7) which is tuned above the received frequency by an amount equal to, by example, 45 MHz. The receiver block (4) demodulates and processes the received signal and provides the processed received signal to an audio processing block (5). The required audio processing is accomplished digitally or in an analog manner, depending on the operating mode. The output of the audio processor 5 drives a loudspeaker (6) whereby a user is enabled to hear the speech of another party during a conversation.

Having described the receiving side, a description is now given of the transmitting side of the dual-mode mobile terminal. A voice signal is fed from a microphone (8) to an analog to digital (A/D) converter (8a) and thence to a vocoder (9), in the digital mode, or to an audio processing block (14) for audio shaping and companding in the analog mode. After audio processing, the signal is fed to a digital to analog converter (D/A) (15) for conversion back to an analog signal. The analog output of the D/A converter (15) is controlled by a controller (20), preferably implemented as a microprocessor that operates under a control program. In the digital mode of operation the controller (20) causes the output signal from the D/A converter (15) to assume a predetermined level, or to be switched out and replaced by a predetermined potential. In the analog mode of operation the controller (20) causes the output of the D/A converter (15) to be coupled to the input of a programmable oscillator of a transmitter synthesizer (Tx SYNTH) (16). That is, the output frequency of the TX-synthesizer (16) is varied in accordance with the input audio signal, thereby achieving a frequency modulation of the TX-synthesizer (16) output frequency. The controller (20) also operates to frequency modulate the TX-synthesizer (16) output frequency in accordance with signalling information to be transmitted. The TX-synthesizer (16) output frequency is also controlled to achieve channel switching.

The output frequency of the TX-synthesizer (16) is applied to a mixer (17) wherein it is mixed with the output of an offset oscillator (18) to generate a transmitter injection signal (LO) at the final transmitter frequency. The offset oscillator (18) is typically set to 90 Mhz. A further oscillator (VCTCXO) (19) provides a precision frequency reference to the RX SYNTH (7), the TX SYNTH (16), and the offset oscillator (18). As an example, a suitable output frequency for the VCTCXO (19) is 19.44 MHz.

It should be realized that the exact frequencies of the transmitter and receiver synthesizers (7) and (16) and the offset oscillator (18) are adjustable according to application specific requirements. The values given above are suitable for use in the dual-mode Interim Standard specified in IS-54-B, and are not intended to be read in a limiting sense upon the practice of the invention. Furthermore, it should be realized that some components of the mobile terminal are not shown in FIG. 1, such as a keypad for entering telephone numbers, etc. These other components operate in a conventional fashion, and are not germane to an understanding of the invention.

In the digital mode of operation the vocoded digital signal is further processed in a signal processing block (10) and fed to a dual-mode modulator (11) that operates in accordance with the invention. The transmitter injection signal (LO) is also input to the dual-mode modulator (11). After I/Q modulation, the transmitter signal is amplified in a transmitter block (12) and fed to a bandpass filter (13) for removing spurious signals. The filtered transmitter signal is then fed to the antenna (1) for transmission, typically, to the base station that serves the cell within which the mobile terminal is located.

The analog/digital modulation mode is controlled automatically by microprocessor (20), in accordance with received signalling information, through the use of a MODE signal. The MODE signal may disable the microphone signal path during digital mode by disabling the D/A converter (15), such as by placing the D/A converter (15) in a low-power mode to conserve battery power.

As will be described in detail below, the MODE signal is also applied to the dual-mode modulator (11) for disabling the $\pi/4$-shift differential quadrature phase shift keying (DQPSK) modulator, and for coupling the FM carrier to the output node of the modulator (11).

Figure 2:
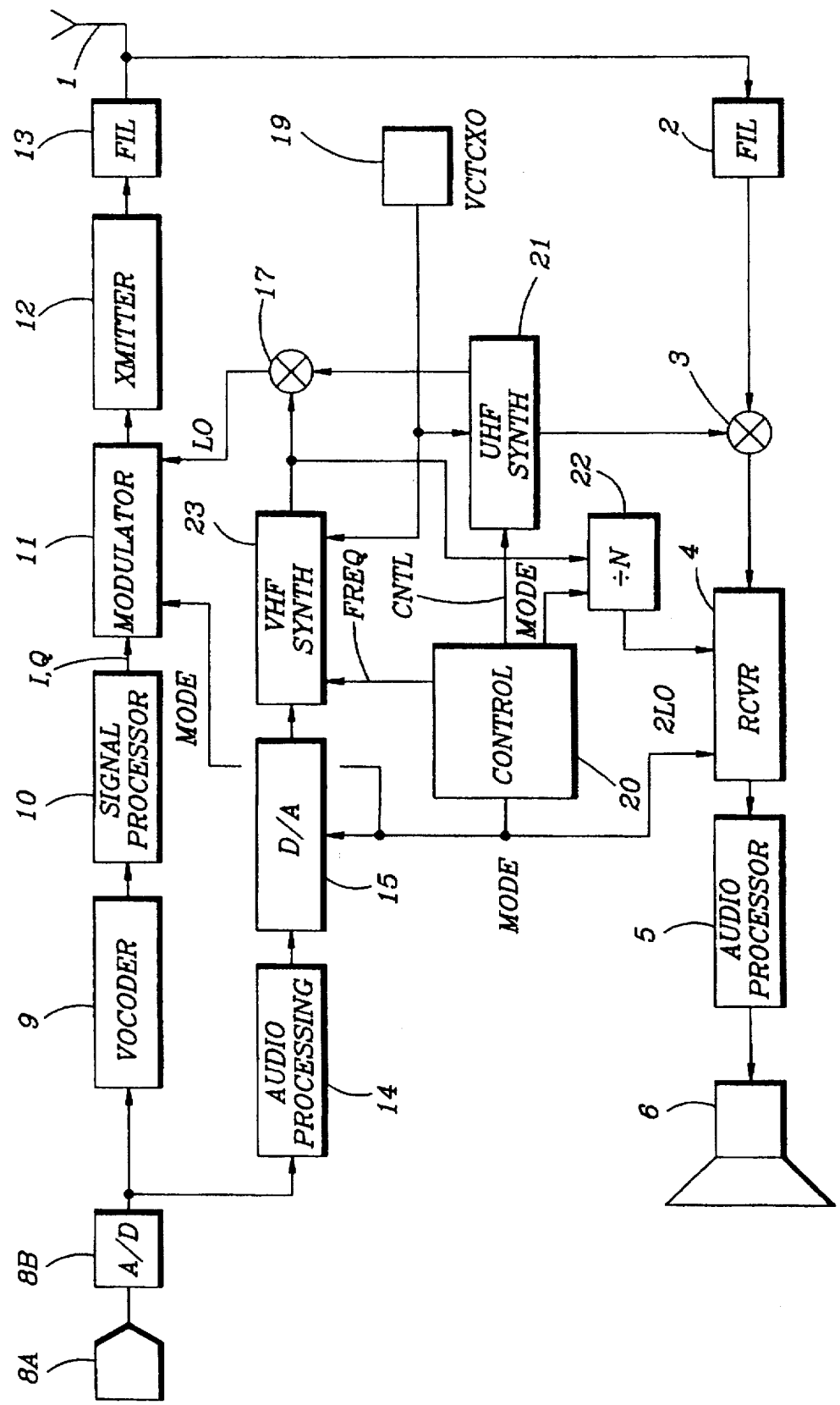
FIG. 2 is a block diagram of a second embodiment of a mobile telephone that is constructed in accordance with the invention.

FIG. 2 illustrates a further embodiment of a dual-mode mobile terminal wherein components found also in FIG. 1 are numbered accordingly. In the embodiment of FIG. 2 only one synthesizer (UHF SYNTH 21) is used to generate the LO signals for both the receiver and transmitter. In addition, a VHF SYNTH (23) is driven in the analog mode to provide frequency modulation to the LO signal. The output frequency of the UHF SYNTH (21) and also the VHF SYNTH (23) are each programmable by the controller (20) within a predetermined range and, in general, the output frequency of the UHF SYNTH (21) is approximately ten times that the VHF SYNTH (23).

The output of the VHF SYNTH (23) is applied to a divide by N circuit (22) before application to the RCVR (4) for use as the 2nd LO in the digital mode. In the analog mode the 2nd LO is not used, due to the frequency modulation present in the output of the offset oscillator (18). As such, the MODE signal is coupled to the divider (22) for disabling same when operating in the analog mode.

Figure 3:
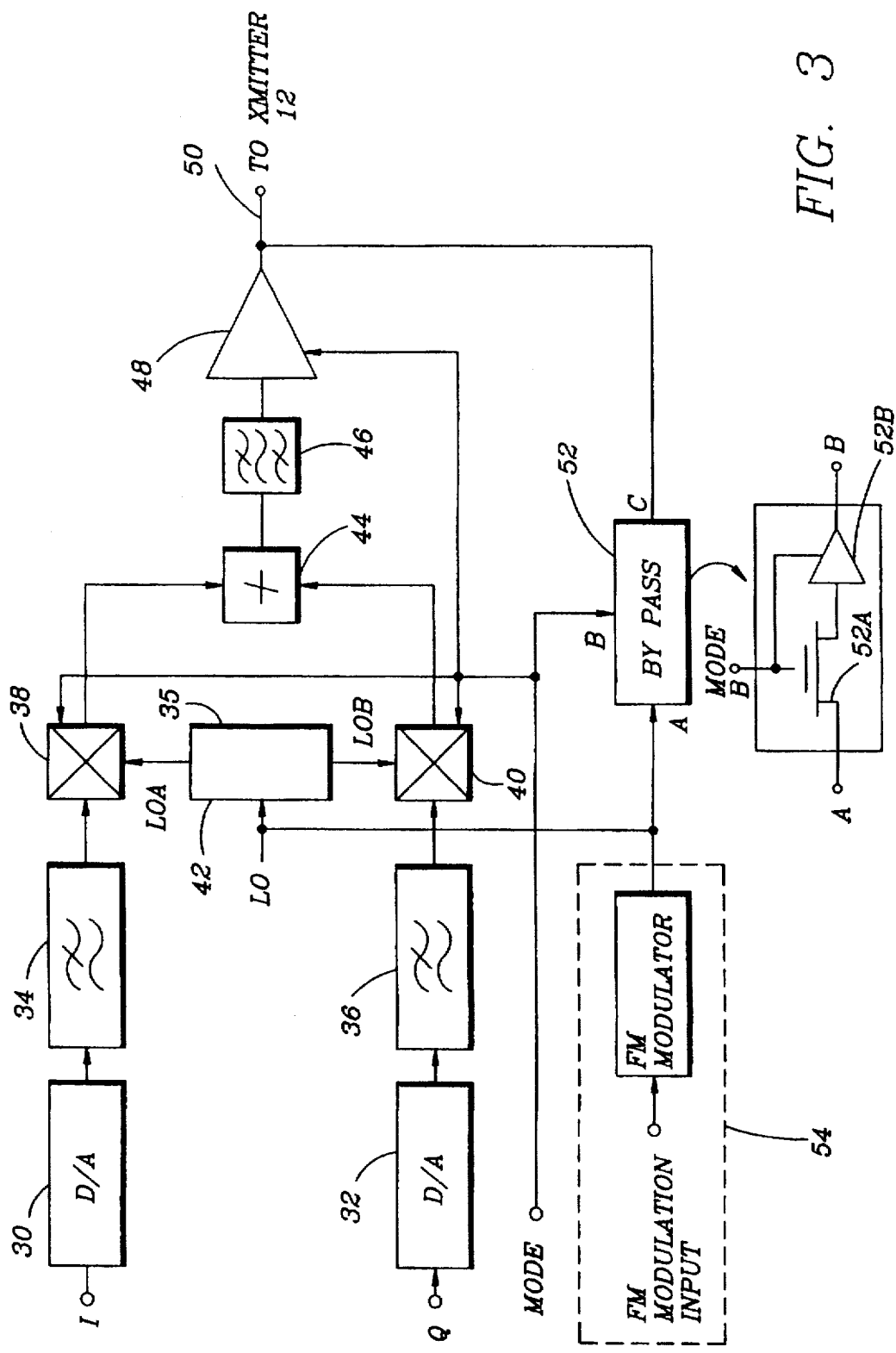
FIG. 3 is a block diagram of an embodiment of a dual-mode (digital/analog) RF modulator that is constructed and operated in accordance with the invention.

FIG. 3 illustrates an embodiment of the dual-mode modulator (11) according to the present invention. The dual-mode modulator (11) operates in two different modes: IQ-modulation mode or frequency-modulation mode, as specified by the state of the MODE signal. It should be realized that in the IQ-modulation mode the radiotelephone may operate as either a TDMA or a spread spectrum or CDMA radiotelephone.

When used in the digital mode (TDMA or CDMA), and referring to the phase modulator portion of the dual-mode modulator (11), the I and Q cosine and sine signals are the orthogonal quadrature components at the baseband frequency. The I and Q signals are converted to analog signals by D/A converters (30) and (32) and fed through low pass filters (34) and (36) to associated mixers (38) and (40). A phase shifter (42) receives the transmit carrier frequency (LO) signal and provides two outputs (LOA) and (LOB) which have a 90° phase shift with respect to one another. The output signals from the mixers (38) and (40) are combined by a summing circuit (44) and thereafter fed through a bandpass filter (46) to an amplifier (48), thereby producing an amplified modulated output signal at the output node (50) of the modulator (11).

In accordance with an aspect of this invention a bypass circuit (52) is provided to enable an alternate signal path when operating in the frequency modulated (analog) mode of operation. This alternate signal path couples the output of the FM circuitry of FIGS. 1 and 2 (shown generally by the block (54)) to the output node (50) of the modulator (11). The bypass circuit (52) is controlled by the MODE signal.

In the IQ-modulation mode the bypass circuit (52) is de-activated by the MODE signal, and the FM input is set such that the LO signal that is input to the phase shifter (35) is an unmodulated CW signal. The output of the IQ-modulator is then defined by:

$$\text{Output} = I\ \text{Cos}(\omega t + p1) + Q\ \text{Cos}(\omega t + p2),$$

where LO=cos($\omega$t), t is time, and p1 and p2 are constants.

In the FM mode the bypass circuit (52) is activated by the MODE signal. If desired, the MODE signal can also be employed to power down the IQ-modulator to conserve power. In particular, those components that consume the most power, such as the mixers (38) and (40), and also possibly the amplifier (48), are placed in a low-power mode of operation, or are turned off completely.

The FM information is applied to the modulation input of the frequency modulator (54). The signal at the output node (50) is then defined by:

$$\text{Output} = A\ \text{Cos}(\omega t + m(t) + p),$$

where LO=Cos($\omega$t+m(t)), A and p are constants, and m(t) is a function the FM input.

In the digital IQ-modulation mode the transmitter (12) is preferably operated in a linear mode (Class A or AB). In the frequency modulation mode the transmitter (12) is preferably operated in a nonlinear mode (Class C) for maximum efficiency. As such, the total gain in the transmitter (12) is a function of the operating mode (class A, AB or C), and the gain when operating in the frequency modulation mode is different than the gain when operating in the IQ-modulation mode. This difference in gains can be compensated for by having different gains in the IQ-modulator, for example the amplifier (48), and in the bypass circuit (52).

The bypass circuit (52) may be constructed with any suitable switching arrangement, such as a relay or a transistor switch (52a). If desired, an output amplifier (52b) can be provided for buffering and to provide the required gain to compensate the variable gain of the transmitter (12), as described above.

Figure 4:
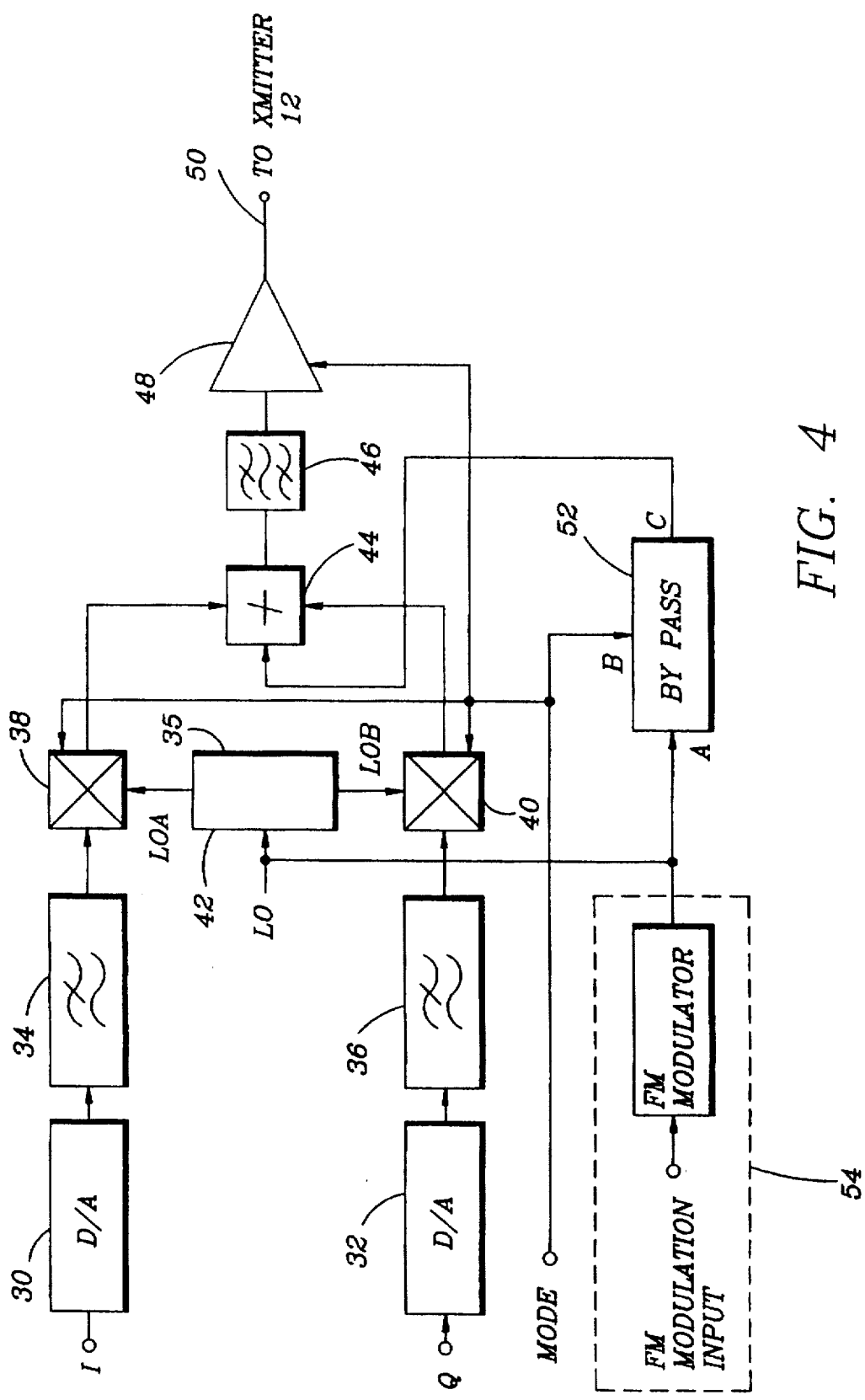
FIG. 4 is a block diagram of a second embodiment of a dual-mode (digital/analog) RF modulator that is constructed and operated in accordance with the invention.

FIG. 4 illustrates a further embodiment of this invention wherein the output of the bypass circuit (52) is coupled to a third input of the summing circuit (44). In this embodiment, and when operating in the digital mode, the output of the bypass circuit (52) is set to zero by the Mode signal, and the summing circuit (44) effectively sums only the I and Q signals. When operating in the digital mode the I and Q signals are each set to zero, and the summing circuit (44) thus responds only to the FM input that is output from the FM circuit (54) through the bypass circuit (52).

The dual-mode modulator (11) is suited for implementation as an integrated circuit or in discrete form. In the IQ-modulation mode the bypass circuit (52) is preferably powered down, and in the frequency modulation mode the IQ modulator can be powered down. Thus, the overall power consumption of the modulator (11) can be optimized independently for each mode of operation.

While the invention has been particularly shown and described with respect to presently preferred embodiments thereof, it will be understood by those skilled in the art that changes in form and details may be made therein without departing from the scope and spirit of the invention. As such, the teaching of the invention is not intended to be limited to only the presently preferred embodiment described above, but is instead intended to be given a scope commensurate with the scope of the claims that follow.

What is claimed is:

1. A dual-mode modulator having an output node, comprising:
    means, responsive to a first state of a control signal, for phase modulating an RF signal, said phase modulating means having an output coupled to the output node;
    means, responsive to a second state of the control signal, for frequency modulating said RF signal in accordance with a frequency modulation input signal and, responsive to said first state of the control signal wherein said frequency modulation input signal is set to a predetermined state, for outputting said RF signal as an unmodulated RF signal to said phase modulating means; and
    means, responsive to the second state of the control signal, for coupling an output of said frequency modulating means to the output node so as to bypass said phase modulating means.

2. A dual-mode modulator having an output node, comprising:
    means, responsive to a first state of a control signal, for phase modulating an RF signal, said phase modulating means comprising at least first and second frequency mixers and having an output coupled to the output node;
    means, responsive to a second state of the control signal, for frequency modulating said RF signal in accordance with a frequency modulation input signal and, responsive to said first state of the control signal wherein said frequency modulation input signal is set to a predetermined state, for outputting said RF signal as an unmodulated RF signal to said phase modulating means; and
    means, responsive to the second state of the control signal, for coupling an output of said frequency modulating means to the output node for bypassing at least said first and second frequency mixers;
    wherein said phase modulating means is responsive to the second state of the control signal for operating in a low power mode of operation.

3. A dual-mode modulator having an output node, comprising:
    means, responsive to a first state of a control signal, for phase modulating an RF signal, said phase modulating means having an output coupled to the output node;
    means, responsive to a second state of the control signal, for frequency modulating an RF signal; and
    means, responsive to the second state of the control signal, for coupling an output of said frequency modulating means to the output node, wherein said coupling means is responsive to the first state of the control signal for operating in a low power mode of operation.

4. A radiotelephone, comprising:
    control means for generating a first state of a control signal when operating the radiotelephone in a first

7 mode of operation and for generating a second state of the control signal when operating the radiotelephone in a second mode of operation;

means, responsive to said control signal, for generating a first representation of an audio input signal when operating in the first mode of operation and for generating a second representation of the audio input signal when operating in the second mode of operation;

means, responsive to the first representation, for generating a first phase modulation control signal and a second phase modulation control signal; and modulator means comprising means, responsive to the second representation, for frequency modulating a transmitter injection frequency signal in accordance with said second representation, said modulator means further comprising means, responsive to the first representation, for phase modulating the transmitter injection frequency signal in accordance with the first representation, said modulator means having an output node for outputting a transmission frequency signal that is modulated, in the first mode of operation, in accordance with said first representation and that is modulated, in the second mode of operation, in accordance with said second representation, said modulator means further comprising, bypass means, responsive to said control signal, for coupling an output of said frequency modulation means to said output node in the second mode of operation by providing a separate signal path around said phase modulating means.

5. A radiotelephone as set forth in claim 4 wherein in said first mode of operation said radiotelephone operates in accordance with a Time Division-Multiple Access technique.

6. A radiotelephone as set forth in claim 4 wherein in said first mode of operation said radiotelephone operates in accordance with a Code Division-Multiple Access technique.

7. A radiotelephone, comprising:

control means for generating a first state of a control signal when operating the radiotelephone in a first mode of operation and for generating a second state of the control signal when operating the radiotelephone in a second mode of operation;

means, responsive to said control signal, for generating a first representation of an audio input signal when operating in the first mode of operation and for generating a second representation of the audio input signal when operating in the second mode of operation;

means, responsive to the first representation, for generating a first phase modulation control signal and a second phase modulation control signal;

means, responsive to the second representation, for frequency modulating a transmitter injection frequency signal in accordance therewith; and modulator means having an output node for outputting a transmission frequency signal that is modulated, in the first mode of operation, in accordance with said first representation and that is modulated, in the second mode of operation, in accordance with said second representation, said modulator means comprising, bypass means, responsive to said control signal, for coupling an output of said frequency modulation means to said output node in the second mode of operation;

wherein said modulator means is comprised of:

8 first and second frequency mixer means that are responsive to said first and second phase modulation control signals, respectively, for phase modulating said transmitter injection frequency signal in accordance therewith; wherein said first and said second frequency mixer means are responsive to said control signal for operating in a low power mode of operation when operating in the second operating mode; and wherein said bypass means is responsive to said control signal for operating in a low power mode of operation when operating in the first operating mode.

8. A dual-mode modulator having an output node, comprising:

means, responsive to a first mode of operation, for phase modulating an RF signal in accordance with an In-phase (I) input signal and a Quadrature (Q) input signal, said phase modulating means comprising at least first and second frequency mixers and having an output coupled to the output node and providing an Output signal given by, $$\text{Output} = I\,\text{Cos}(\omega t + p1) + Q\,\text{Cos}(\omega t + p2),$$

where LO=cos($\omega$t), t is time, and p1 and p2 are constants;

means, responsive to a second mode of operation, for frequency modulating said RF frequency signal in accordance with a frequency modulation input and providing an Output signal given by, $$\text{Output} = A\,\text{Cos}(\omega t + m(t) + p),$$

where LO=Cos($\omega$t+m(t)), A and p are constants, and m(t) is a function of the frequency modulation input, said frequency modulating means being responsive to said first mode of operation and said frequency modulation input being placed in a predetermined state for outputting said RF signal as an unmodulated RF signal to said phase modulating means; and means, responsive to the second mode of operation, for bypass coupling said Output signal of said frequency modulating means around at least said first and second frequency mixers to the output node.

9. A dual-mode modulator having an output node, comprising:

means, responsive to a first mode of operation, for phase modulating an RF signal in accordance with an In-phase (I) input signal and a Quadrature (Q) input signal, said phase modulating means comprising at least first and second frequency mixers and having an output coupled to the output node and providing an Output signal given by, $$\text{Output} = I\,\text{Cos}(\omega t + p1) + Q\,\text{Cos}(\omega t + p2),$$

where LO=cos($\omega$t), t is time, and p1 and p2 are constants;

means, responsive to a second mode of operation, for frequency modulating said RF frequency signal in accordance with a frequency modulation input and providing an Output signal given by, $$\text{Output} = A\,\text{Cos}(\omega t + m(t) + p),$$

where LO=Cos($\omega$t+m(t)), A and p are constants, and m(t) is a function of the frequency modulation input, said frequency modulating means being responsive to said first mode of operation and said frequency modulation input being placed in a predetermined state for outputting said RF signal as an unmodulated RF signal to said phase modulating means; and means, responsive to the second mode of operation, for coupling said Output signal of said frequency modulating means around at least said first and second frequency mixers to the output node;

wherein said phase modulating means is responsive to the second mode of operation for operating in a low power mode.

10. A dual-mode modulator having an output node, comprising:

means, responsive to a first mode of operation, for phase modulating an RF signal in accordance with an In-phase (I) input signal and a Quadrature (Q) input signal, said phase modulating means having an output coupled to the output node and providing an Output signal given by, $$\text{Output} = I\,\cos(\omega t + p1) + Q\,\cos(\omega t + p22),$$

where LO=cos($\omega t$), t is time, and p1 and p2 are constants;

means, responsive to a second mode of operation, for frequency modulating an RF frequency signal in accordance with a frequency modulation input and providing an Output signal given by, $$\text{Output} = A\,\cos(\omega t + m(t) + p),$$

where LO=Cos($\omega t + m(t)$), A and p are constants, and m(t) is a function of the frequency modulation input; and means, responsive to the second mode of operation, for coupling said Output signal of said frequency modulating means to the output node;

wherein said coupling means is responsive to the first mode of operation for operating in a low power mode.

11. A dual-mode modulator having an output node, comprising:

means, responsive to a first mode of operation, for phase modulating an RF signal in accordance with an In-phase (I) input signal and a Quadrature (Q) input signal, said phase modulating means having an output coupled to the output node and providing a first output signal given by, $$\text{output} = I\,\cos(\omega t + p1) + Q\,\cos(\omega t + p2),$$

where LO=cos($\omega t$), t is time, and p1 and p2 are constants;

means, responsive to a second mode of operation, for frequency modulating an RF frequency signal in accordance with a frequency modulation input and providing a second output signal given by, $$\text{Output} = A\,\cos(\omega t + m(t) + p),$$

where LO=Cos($\omega t + m(t)$), A and p are constants, and m(t) is a function of the frequency modulation input; and summing means having an output coupled to said output node and a first input coupled to said I Cos($\omega t + p1$) component of said first output signal, a second input coupled to said Q Cos($\omega t + p2$) component of said first output signal, and a third input coupled to said A Cos($\omega t + m(t) + p$) component of said second output signal.

12. A dual-mode modulator as set forth in claim 11, wherein said modulator forms a portion of a radiotelephone, and wherein in said first mode of operation said radiotelephone operates in accordance with a Time Division-Multiple Access technique.

13. A dual-mode modulator as set forth in claim 11, wherein said modulator forms a portion of a radiotelephone, and wherein in said first mode of operation said radiotelephone operates in accordance with a Code Division-Multiple Access technique.

* * * * *